United States Patent Office 2,741,606
Patented Apr. 10, 1956

2,741,606

FLUOROCYANURATES

Harold S. Holt and John T. Maynard, Wilmington, Del., assignors to E. I. du Pont de Nemours and Company, Wilmington, Del., a corporation of Delaware No Drawing. Application May 25, 1955,
Serial No. 511,119

8 Claims. (Cl. 260—248)

This invention relates to a new class of fluorine-containing organic compounds and their preparation. More particularly, this invention relates to a new class of heterocyclic compounds containing polyfluoroalkoxy groups and their preparation.

The trialkyl esters of cyanuric acid, which are also called 2,4,6-trialkoxy-1,3,5-triazines, have been reported in the chemical literature. For many industrial applications, such compounds lack the chemical inertness, e. g., heat stability, resistance to hydrolysis, resistance to oxidation and combustion, etc., which is required. Triaryl cyanurates have also been reported in the chemical literature, but these products are relatively high melting.

It is an object of this invention to provide a new class of fluorine-containing organic compounds and a method for their preparation. A further object is to provide a new class of heterocyclic compounds containing polyfluoroalkoxy groups. Another object is to provide a new class of esters of cyanuric acid which are liquid or relatively low melting solids and therefore much more suitable for many industrial uses than the high melting triaryl cyanurates. An additional object is to provide new esters of cyanuric acid which possess to a marked degree the desirable properties of heat stability, resistance to hydrolysis, resistance to oxidation and combustion and general chemical inertness. Other objects will appear hereinafter.

These and other objects of this invention are accomplished by providing a new class of esters of cyanuric acid, the tris(polyfluoroalkyl)cyanurates, which also can be called the 2,4,6-tris(polyfluoroalkoxy)-1,3,5-triazines. These new esters of cyanuric acid have the formula

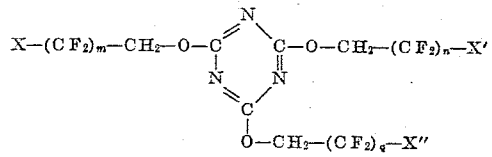

wherein X, X' and X" are hydrogen or fluorine and $m$, $n$ and $q$ are integers from 1 to 20 inclusive, and preferably from 3 to 10 inclusive.

These esters can be prepared in good yields by reacting, in the molar ratio of approximately 1 to 3, cyanuric chloride with one or more alkali metal alcoholates of a polyfluoroalkanol of the formula X—(CF$_2$)$_n$—CH$_2$OH, where X is hydrogen or fluorine and $n$ is an integer from 1 to 20, and preferably from 3 to 10. When more than one polyfluoroalkanol is used, mixed esters are obtained. When only one polyfluoroalkanol is used, a tris(polyfluoroalkyl)cyanurate is obtained having the general formula:

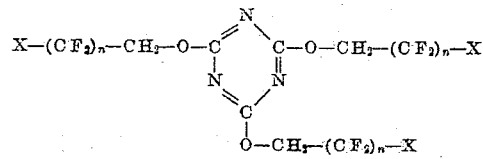

wherein X is hydrogen or fluorine and $n$ is an integer from 1 to 20 inclusive, and preferably from 3 to 10.

Cyanuric chloride

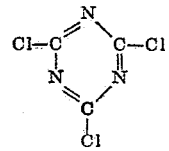

is a commercial product. The short chain polyfluoroalkanols of the above-specified type, such as difluoroethyl alcohol or trifluoroethyl alcohol, have been known for many years. The longer chain polyfluoroalkanols having a hydrogen atom on the terminal carbon, i. e., having the formula H(CF$_2$)$_n$—CH$_2$OH can be prepared by condensing tetrafluoroethylene with methanol as described in U. S. Patent 2,559,628, issued July 10, 1951. The longer chain completely fluorinated (except for the carbinol carbon) polyfluoroalkanols, i. e., those having the formula F(CF$_2$)$_n$—CH$_2$OH, can be prepared by reduction of the corresponding fluorocarboxylic acids, their esters or halides, which are described in U. S. Patent 2,567,011, issued September 4, 1951, using for example the lithium aluminum hydride reduction method described in the literature for halogenated acids (see e. g., J. Amer. Chem. Soc. 70, 1968 (1948), and 71, 1710 (1949)).

The preparation of the tris(polyfluoroalkyl)cyanurates is preferably carried out in an anhydrous organic diluent having a neutral reaction and substantially inert towards reactants and reaction products. Suitable diluents include the aliphatic, cycloaliphatic or aromatic hydrocarbons such as n-hexane, cyclohexane, benzene, toluene, the xylenes; or ethers such as diethyl ether, di-n-butyl ether, tetrahydrofuran or dioxane. The reaction proceeds even at room or lower temperatures, e. g., 0–25° C., but can be carried out at higher temperatures, e. g., up to 200° C. or higher, and if desired under superatmospheric pressure. The alkali metal chloride which forms during the reaction is removed from the mixture by filtration or washing with water, and the tris(polyfluoroalkyl)cyanurate is isolated by distillation and/or recrystallization from an appropriate solvent.

The invention is illustrated in greater detail by the following examples, in which parts are by weight.

Example I

The starting material was the fraction, consisting essentially of dodecafluoroheptyl alcohol, H(CF$_2$)$_6$CH$_2$OH, of the polyfluoroalkanols made by polymerizing tetrafluoroethylene in the presence of methanol. A solution of 119.2 parts of this fraction in 200 parts of toluene was treated with 14.1 parts of potassium metal, keeping the temperature below 30° C., to form the potassium alcoholate. This reaction took about 20 hours to go to completion. A solution of 22.2 parts of cyanuric chloride in 200 parts of toluene was then added over a period of one-half hour. The mixture was then refluxed for one-half hour, allowed to cool, and filtered to remove the precipitated potassium chloride. After removing the toluene and the small amount of unreacted dodecafluoroheptyl alcohol by distillation, the residue was distilled in a molecular still at a pressure of about 0.25 micron. The majority of the distillate (60.7 parts) distilled at a bath temperature of 100–125° C. It was a viscous, straw-colored liquid with a refractive index $n_D^{25}$ 1.3604. Analysis showed that it consisted essentially of tris(dodecafluoroheptyl)cyanurate.

*Analysis.*—Calc'd for C$_{24}$F$_{36}$H$_9$O$_3$N$_3$: N, 3.92; F, 63.85 Found: N, 3.87; F, 62.72.

This product was distillable at atmospheric pressure, where it boiled in the range 350–380° C. with only slight decomposition.

*Example II*

The sodium alcoholate of carefully fractionated, substantially pure dodecafluoroheptyl alcohol was prepared by treating 175 parts of this alcohol with 12 parts of sodium hydride in 400 parts of anhydrous diethyl ether. To the resulting solution was added over a period of about one hour 30.75 parts of cyanuric chloride dissolved in a mixture of 200 parts of dry diethyl ether and 50 parts of dry dioxane. A mildly exothermic reaction took place which raised the temperature to the refluxing point (35° C.) of diethyl ether. After stirring for about one-half hour to complete the reaction, the mixture was washed with water to remove the sodium choride, which was so finely divided that it could not be conveniently filtered, and the organic layer was separated and dried with anhydrous potassium carbonate. When the solvents were distilled there remained a waxy solid which was recrystallized from 250 parts of carbon tetrachloride to give 134 parts of pure tris-(dodecafluoroheptyl)cyanurate, M. P. 46–48° C.

*Analysis.*—Calc'd for $C_{24}F_{36}H_9O_3N_3$: N, 3.92; F, 63.85. Found: N, 3.84; F, 63.42.

*Example III*

Using the procedure of Example II, a mixture of 62.7 parts of octafluoropentanol, $H(CF_2)_4CH_2OH$; 73 parts of dodecafluoroheptanol, $H(CF_2)_6CH_2OH$; and 83.5 parts of hexadecafluorononanol, $H(CF_2)_8CH_2OH$ was treated with 15 parts of sodium hydride in 400 parts of diethyl ether. The resulting mixed sodium alcoholate was treated with 38.4 parts of cyanuric chloride in 200 parts of diethyl ether and 100 parts of dioxane. The mixed tris(polyfluoroalkyl)cyanurate so obtained (190 parts) was a moderately viscous liquid boiling at 370–390° C. at atmospheric pressure with slight decomposition, $n_D^{25}$ 1.3588.

*Example IV*

Using the procedure of Example II, 125 parts of heptafluorobutyl alcohol, $CF_3$—$CF_2$—$CF_2$—$CH_2OH$, was converted to the sodium alcoholate by treatment with 15 parts of sodium hydride in 400 parts of diethyl ether. The suspension was treated with 40 parts of cyanuric chloride in 200 parts of diethyl ether and 100 parts of dioxane. The reaction product was a waxy solid which was recrystallized from carbon tetrachloride to give 106 parts of tris(heptafluorobutyl)cyanurate, M. P. 103–104° C.

*Analysis.*—Calc'd for $C_{15}F_{21}H_6N_3O_3$: F, 59.11; C, 26.70; H, 0.90. Found: F, 59.88; C, 27.03; H, 1.12.

The products of this invention have been illustrated in the above examples with reference to certain specific tris(polyfluoroalkyl)cyanurates. By substituting other appropriate polyfluoroalkanols for those shown, and using essentially the procedure described, other tris(polyfluoroalkyl)cyanurates of the general formula given herein are obtained. These include, for example, the triesters of the formula

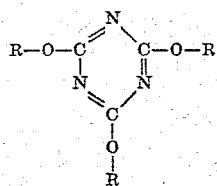

where R is difluoroethyl, —$CH_2$—$CF_2H$; trifluoroethyl, —$CH_2$—$CF_3$; tetrafluoropropyl, —$CH_2$—$(CF_2)_2H$; pentafluoropropyl, —$CH_2$—$(CF_2)_2F$; nonafluoropentyl,

—$CH_2$—$(CF_2)_4F$ undecafluorohexyl, —$CH_2$—$(CF_2)_5F$; tridecafluoroheptyl, —$CH_2$—$(CF_2)_6F$; pentadecafluorooctyl,

—$CH_2$—$(CF_2)_7F$ nonadecafluorodecyl, —$CH_2$—$(CF_2)_9F$; eicosafluoroundecyl, —$CH_2$—$(CF_2)_{10}$; tetracosafluorotridecyl,

—$CH_2$—$(CF_2)_{12}H$ dotriacontafluoroheptadecyl, —$CH_2$—$(CF_2)_{16}H$; tetracontafluoroheneicosyl, —$CH_2$—$(CF_2)_{20}H$; and the like. The preferred tris(polyfluoroalkyl)cyanurates, because of the greater availability of the fluoroalkanols used as starting materials, are those in which the polyfluoroalkyl group has from 4 to 11 carbon atoms, inclusive, i. e., $n$ in the general formula is an integer from 3 to 10 inclusive. As has been shown, mixed esters can be prepared by using a mixture of two or more different polyfluoroalkanols rather than one individual compound.

The tris(polyfluoroalkyl)cyanurates range in appearance from viscous, high boiling liquids to semi-solid waxes to crystalline solids of relatively low melting points. They are insoluble in water but soluble in many common organic solvents such as diethyl ether, dioxane, carbon tetrachloride, the aromatic hydrocarbons, etc.

These esters are characterized by their remarkable resistance to hydrolysis under either acid or alkaline conditions. For example, samples of the solid tris(dodecafluoroheptyl)cyanurate of Example II were stirred in boiling 0.5 N hydrochloric acid and in boiling 0.5 N sodium hydroxide solutions for three hours without any loss in weight or depression of the melting point (46–48° C.). Similarly, the liquid mixed cyanurate of Example III showed no evidence of hydrolysis or significant change in refractive index after being subjected to the same treatment. In comparison, when tris-n-hexyl cyanurate, a closely related but non-fluorinated ester, was stirred in boiling 0.5 N hydrochloric acid for three hours, about 40% of the ester was hydrolyzed, and a similar treatment with 0.5 N sodium hydroxide caused about 18% hydrolysis.

The tris(polyfluoroalkyl)cyanurates are further characterized by their great thermal stability. As has been shown, they are distillable at atmospheric pressure up to temperatures approaching 400° C. They are stable at 250° C. in contact with air. For example, the ester of Example II was held in a bath at 250° C. with a stream of air bubbling through the sample for three hours. Slight darkening occurred but the sample showed no melting point depression after this treatment. The liquid mixed ester of Example III was held at 250° C. with a stream of air passing through the sample for six hours with no evidence of decomposition and no change in refractive index. Even at temperatures exceeding 300° C., these esters showed only slight evidence of evolution of hydrogen fluoride on prolonged heating. In comparison, heating tris-n-hexyl cyanurate at 250° C. in air for only one hour caused extensive degradation.

By virtue of their physical and chemical properties, the tris(polyfluoroalkyl)cyanurates of this invention are particularly suitable as heat-transfer media, hydraulic fluids and heat-stable lubricants. They are also useful as flame-retardant plasticizers for such resins as polymethyl methacrylate, polystyrene, polyvinyl chloride, polyvinyl fluoride, alkyd resins, and the like.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

What is claimed is:

1. A tris(polyfluoroalkyl)cyanurate having the formula

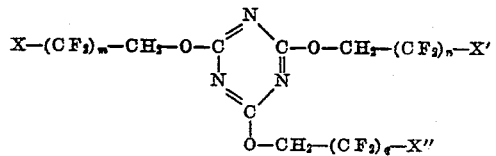

wherein X, X' and X" are selected from the class consisting of hydrogen and fluorine and $m$, $n$ and $q$ are integers from 1 to 20 inclusive.

2. A tris(polyfluoroalkyl)cyanurate having the formula

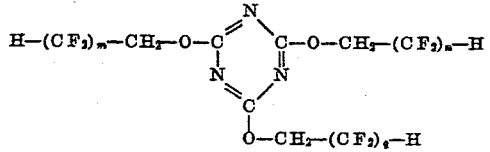

wherein $m$, $n$ and $q$ are integers from 1 to 20 inclusive.

3. A tris(polyfluoroalkyl)cyanurate having the formula

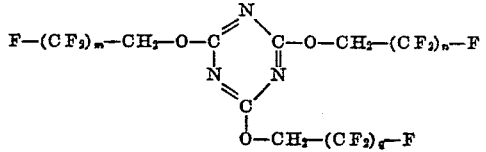

wherein $m$, $n$, and $q$ are integers from 1 to 20 inclusive.

4. A tris(polyfluoroalkyl)cyanurate having the formula

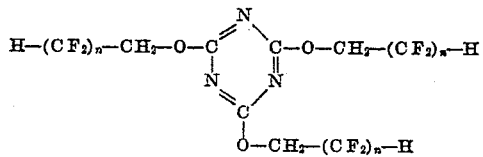

where $n$ is an integer from 3 to 10 inclusive.

5. A tris(polyfluoroalkyl)cyanurate having the formula

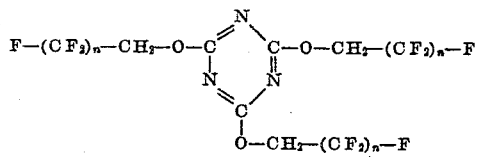

wherein $n$ is an integer from 3 to 10 inclusive.

6. Tris(dodecafluoroheptyl)cyanurate which is the ester of cyanuric acid with dodecafluoroheptyl alcohol of the formula $H(CF_2)_6CH_2OH$.

7. Tris(heptafluorobutyl)cyanurate which is the ester of cyanuric acid with heptafluorobutyl alcohol of the formula $CF_3CF_2CF_2CH_2OH$.

8. A tris(polyfluoroalkyl)cyanurate which is a mixed ester of cyanuric acid with octafluoropentanol of the formula $H(CF_2)_4CH_2OH$, dodecafluoroheptanol of the formula $H(CF_2)_6CH_2OH$, and hexadecafluorononanol of the formula $H(CF_2)_8CH_2OH$.

No references cited.